United States Patent [19]

Busch

[11] 4,003,267
[45] Jan. 18, 1977

[54] CYCLICALLY OPERABLE DRIVE TRANSMISSION

[75] Inventor: Richard E. Busch, La Puente, Calif.

[73] Assignee: Addmaster Corporation, San Gabriel, Calif.

[22] Filed: Feb. 12, 1976

[21] Appl. No.: 657,615

[52] U.S. Cl. .............................. 74/84 R; 74/112; 74/435

[51] Int. Cl.$^2$ ................. F16H 27/04; F16H 29/00; F16H 55/04

[58] Field of Search ...................... 74/84, 112, 435

[56] References Cited

UNITED STATES PATENTS

| | | | |
|---|---|---|---|
| 3,618,722 | 11/1971 | Eschenbach | 74/84 |
| 3,890,853 | 6/1975 | Feltz | 74/435 |
| 3,941,000 | 3/1976 | Allison, Jr. | 74/3.5 |
| 3,965,618 | 6/1976 | Pickles | 74/435 X |

Primary Examiner—Leonard H. Gerin
Attorney, Agent, or Firm—Fred N. Schwend

[57] ABSTRACT

A cyclically operable clutch in which first and second driven gears are provided with interrupted gear tooth sections normally located opposite a motor driven drive gear. The second gear is operably connected to a cyclically operable driven mechanism and the first gear is spring urged to rotate relative to the second gear. A latch normally maintains the first gear out of mesh with the drive gear. Upon release of the latch, the first gear is spring advanced into mesh with the drive gear and a lost motion connection between the driven gears transmits rotation to the second gear to advance the latter into mesh with the drive gear.

7 Claims, 5 Drawing Figures

U.S. Patent
Jan. 18, 1977
4,003,267
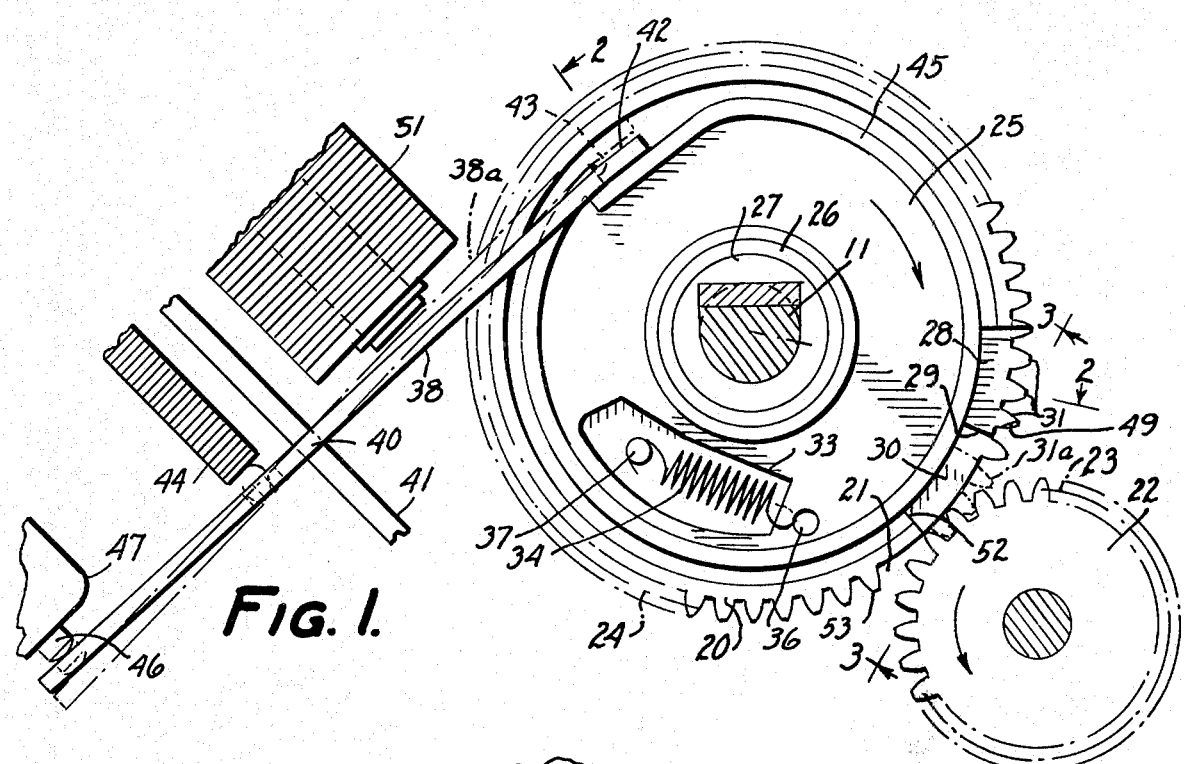
Fig. 1.
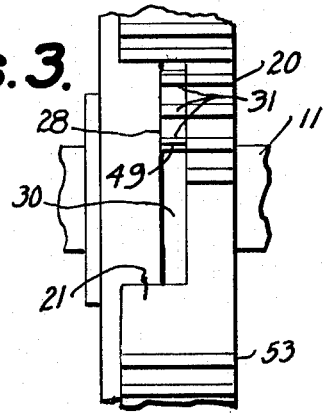
Fig. 3.
Fig. 5.
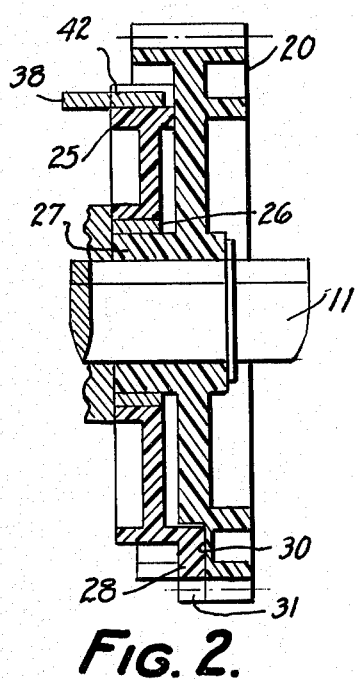
Fig. 2.
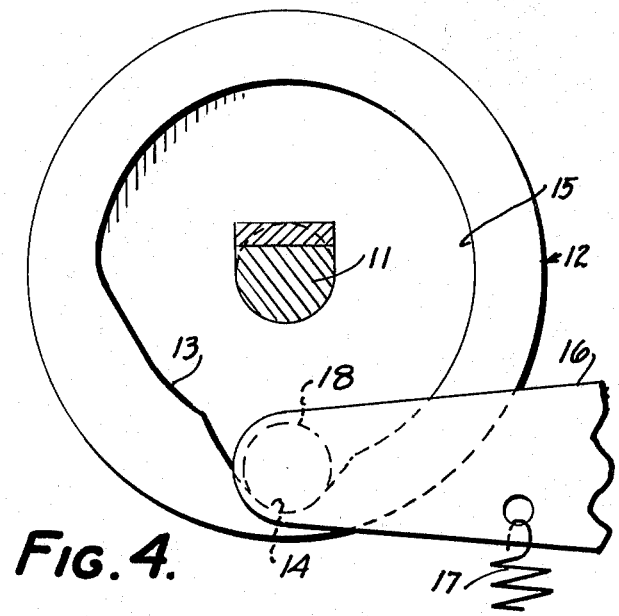
Fig. 4.

CYCLICALLY OPERABLE DRIVE TRANSMISSION

BACKGROUND OF THE INVENTION

1. Field of the Invention

This invention relates to cyclically operable clutches or drive transmissions for transmitting a drive to a cyclically operable mechanism, such as a data printer.

2. Description of the Prior Art

Cyclically operable clutches of the above type generally comprise a ratchet wheel and a clutch dog engageable with such wheel. One of these elements forms the driving element and the other the driven element of the clutch. When a drive is to be effected, the clutch dog is engaged with a tooth of the ratchet wheel to establish the drive, and after acertain increment of rotation, generally a complete revolution, the clutch dog is released and the mechanism brought to rest. Such clutches are engaged and disengaged instantaneously, causing a severe shock to be transmitted to the driven mechanism at both the start and the completion of a cycle. Unfortunately, such sudden starting occurs when inertia and starting friction of the driven mechanism is at a peak. Likewise, stopping usually occurs when momentum of the driven mechanism is at a high level.

SUMMARY OF THE INVENTION

A principal object of the present invention is to provide a cyclically operable clutch which reduces shocks incident to starting and stopping a cyclically operable mechanism.

Another object is to reduce the forces required to cause engagement of a cyclically operable clutch.

Another object is to provide a simple and inexpensive cyclically operable clutch.

According to the present invention, a pair of driven gears are provided having interrupted gear teeth thereon. Centralizing means normally holds a second one of the gears with the interrupted section of the gear teeth thereof opposite a motor driven drive gear. A latch normally holds the first driven gear in a similar position to locate the interrupted section of its gear teeth opposite the drive gear. Spring means extending between the gears tends to rotate the first gear into mesh with the drive gear. When the latch is released the spring means advances the first gear into mesh with the drive gear, which, through a lost motion connection, advances the second gear into meshing relation with the drive gear to transmit a drive through a complete cycle.

BRIEF DESCRIPTION OF THE DRAWING

The manner in which the above and other objects of the invention are accomplished will be readily understood on reference to the following specification when read in conjunction with the accompanying drawing, wherein:

FIG. 1 is a sectional side view illustrating a cyclically operable clutch embodying a preferred form of the present invention.

FIG. 2 is a transverse sectional view taken along line 2—2 of FIG. 1.

FIG. 3 is a fragmentary transverse view taken substantially along the line 3—3 of FIG. 1.

FIG. 4 is a side view illustrating the centralizing device for the driven side of the clutch.

FIG. 5 is a schematic view illustrating the motor circuit.

DESCRIPTION OF THE PREFERRED EMBODIMENT

Referring to the drawing, the clutch shown therein is particularly intended to transmit a drive to a cyclically operable data printer (not shown), the printer including a main drive shaft 11 which is rotated clockwise through one complete revolution from its illustrated position to drive the printer through one complete cycle. However, it is to be understood that the clutch can, with obvious modifications, be applied to other forms of cyclically operable devices.

The shaft 11 is normally yieldably maintained in its illustrated full cycle position by a centralizer device shown in FIG. 4 and comprising a centralizer cam 12 keyed on shaft 11 having a internal centralizing cam way 13 formed therein. The cam way has a depression 14 and a dwell portion 15 extending through the major portion of its periphery. A centralizing arm 16 is pivotally supported in a manner not shown and is urged downwardly by a tension spring 17 to normally maintain a stud 18 thereon engaged in the depression 14.

An interrupted gear 20 is keyed on shaft 11 and has a section 21 which is devoid of gear teeth. As shown in FIG. 1, such section is normally located opposite a full toothed motor driven drive gear 22. However, the pitch circle 23 of gear 22 lies tangent with the pitch circle 24 of gear 20.

A clutch gear 25, which is also an interrupted gear, is provided with a bearing sleeve 26 rotatably mounted on a hub 27 formed on gear 20. Gear 25 has a laterally extending gear section 28 fitting within a pocket 30 formed in gear 20 and comprising three gear teeth 31. The pocket 30 is larger than the section 28, forming a lost motion connection between the two gears and permitting gear 25 to move its gear teeth 31 from their full line illustrated positions of FIG. 1 to their dotted line positions 31a.

An opening 33 is formed in gear 25 to receive a relatively light spring 34 tensioned between a spring hole 36 in gear 25 and a post 37 on gear 20. Spring 34 tends to rotate the gear 25 clockwise to advance the gear teeth 31 into mesh with the drive gear 22 but this is normally prevented by latch 38 fulcrummed at 40 on a frame member 41. The latch has a hook portion 42 which is normally engaged against a stop shoulder 43 on gear 25 by means of a spring 44 tensioned between the latch 38 and a suitable part of the machine frame. Shoulder 43 forms part of an annular shoulder 45 extending around the gear 25.

It should be noted that spring 34 is incapable of driving the gear 20 and centralizer cam 12 against the action of the spring operated centralizer arm 16.

The latch 38 normally depresses the plunger 46 of a motor switch 47 to hold the same in open condition. As seen in FIG. 5, switch 47 is connected in series with a motor circuit 48 for a motor 50 which drives the gear 22.

An electromagnet 51 is suitably mounted on the frame work of the printer and, when energized, it rocks the latch 38 counterclockwise into its dotted line position 38a, allowing switch 47 to close to initiate operation of the motor 50. Concurrently, the latch 38 releases the shoulder 43 of gear 25, enabling the tension spring 34 to advance the latter gear clockwise until its leading tooth 31 moves into mesh with drive gear 22.

In order to facilitate meshing of the gear section 28 with the drive gear 22 and to eliminate any tendency for a tooth of the drive gear 22 to strike and jam against the top of the leading one of the teeth 31, such leading tooth is preferably chamfered as indicated at 49.

When the gear section 28 is in full mesh with the drive gear 22 its gear teeth 31 will present a continuous train of teeth with the remaining teeth of gear 20. Also, at this time, the advancing edge 29 of the gear section 28 will engage a shoulder 52 of the pocket 30 in gear 20, thereby establishing a driving connection between the gears 20 and 25. Accordingly, the gear 20 will smoothly advance into mesh with the drive gear 22 and will thereafter be driven through substantially a complete revolution by the drive gear.

If only a single cycle is to be effected, the electromagnet 51 may be deenergized prior to the end of the cycle, allowing the hook portion 42 of latch 38 to ride on the annular shoulder 45 until it again engages the stop shoulder 43 to arrest the gear 25.

Just prior to completion of a complete revolution, the trailing tooth 53 on gear 20 will move out of mesh with the drive gear 22. At this time, the momentum of the driven mechanism and the action of the centralizer arm 16 in moving toward the bottom of the depression 14 will advance the shaft 11 and mechanism driven thereby into their full cycle positions.

It will be obvious to those skilled in the art that many variations may be made in the exact construction shown without departing from the spirit of this invention.

I claim:

1. A cyclically operable drive transmission comprising
    a drive gear,
    a first rotatable driven gear,
    said first driven gear having a first interrupted gear tooth section,
    first maintaining means normally maintaining said first gear in an initial position wherein the interrupted portion of said gear tooth section is opposite said drive gear,
    a second driven gear,
    said second gear having a second interrupted gear tooth section,
    second maintaining means for normally maintaining said second driven gear in an initial position wherein the interrupted portion of said second gear tooth section is opposite said drive gear,
    means for urging said first gear relative to said second gear,
    means for releasing said first maintaining means whereby to enable said first gear tooth section of said first gear to mesh with said drive gear, and
    means operable by said first gear for driving said second gear to mesh said second gear tooth section of said second gear with said drive gear.

2. A cyclically operable drive transmission as defined in claim 1 comprising
    means supporting said first and second drive gears for rotation about a common axis.

3. A cyclically operable drive transmission according to claim 1 wherein said last mentioned means comprises a lost motion connection.

4. A cyclically operable drive transmission as defined in claim 1 wherein said second maintaining means comprises a yieldable detenting device.

5. A cyclically operable drive transmission as defined in claim 1 wherein said urging means comprises spring means connected between said first and second drive gears.

6. A cyclically operable drive mechanism as defined in claim 1 comprising
    motor means for driving said drive gear,
    an electric circuit including a normally open switch for energizing said motor means; and
    means operable by said releasing means for causing said switch to close.

7. A cyclically operable drive transmission comprising
    a drive gear,
    a first rotatable driven gear,
    said first gear having a first interrupted gear tooth section meshable with said drive gear,
    a latch normally latching said first gear in an initial position wherein the interrupted portion of said first gear tooth section is opposite said drive gear,
    a second driven gear rotatable about the axis of said first gear,
    said second gear having a second interrupted gear tooth section meshable with said drive gear,
    a yieldable detent device normally maintaining said second gear in full cycle position wherein the interrupted portion of said second gear tooth section is opposite said drive gear,
    spring means connected between said first and second gears for urging said first gear about its axis relative to said second gear,
    means for releasing said latch whereby to cause said first gear tooth section of said first gear to mesh with said drive gear, and
    means including lost motion connection operable by said first gear for driving said second gear into mesh with said drive gear,
    said detent device returning said second gear to said full cycle position.

* * * * *